US008772711B1

(12) United States Patent
Webb et al.

(10) Patent No.: US 8,772,711 B1
(45) Date of Patent: Jul. 8, 2014

(54) APPARATUS AND METHOD OF DISSOCIATING IONS IN A MULTIPOLE ION GUIDE

(71) Applicants: Ian K. Webb, Kennewick, WA (US); Keqi Tang, Richland, WA (US); Richard D. Smith, Richland, WA (US); Yehia M. Ibrahim, Richland, WA (US); Gordon A. Anderson, Benton City, WA (US)

(72) Inventors: Ian K. Webb, Kennewick, WA (US); Keqi Tang, Richland, WA (US); Richard D. Smith, Richland, WA (US); Yehia M. Ibrahim, Richland, WA (US); Gordon A. Anderson, Benton City, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/011,529

(22) Filed: Aug. 27, 2013

(51) Int. Cl.

| | |
|---|---|
| ***H01J 49/42*** | (2006.01) |
| ***H01J 49/26*** | (2006.01) |
| ***B01D 59/44*** | (2006.01) |
| ***H01J 49/06*** | (2006.01) |

(52) U.S. Cl.
CPC .................................... *H01J 49/063* (2013.01)
USPC ........... 250/292; 250/281; 250/282; 250/283; 250/293; 250/288

(58) Field of Classification Search
USPC .................. 250/281, 282, 283, 292, 293, 288
See application file for complete search history.

(56) References Cited

U.S. PATENT DOCUMENTS

| | | | | |
|---|---|---|---|---|
| 6,512,226 | B1 | 1/2003 | Loboda et al. | |
| 6,753,523 | B1 * | 6/2004 | Whitehouse et al. | 250/292 |
| 6,949,743 | B1 | 9/2005 | Schwartz | |
| 7,034,292 | B1 * | 4/2006 | Whitehouse et al. | 250/289 |
| 7,858,926 | B1 * | 12/2010 | Whitehouse et al. | 250/281 |
| 2008/0185518 | A1 | 8/2008 | Syms | |

OTHER PUBLICATIONS

Birkinshaw, K., et al., The focusing of an ion beam from a quadrupole mass filter using an elecgtrostatic octopole lense, J. Phys. E: Sci. Instrum., 11, 1978, 1037-1040.
Cunningham, C. Jr., et al., High amplitude short time excitation: A method to form and detect low mass product ions in a quadrupole ion trap mass spectrometer, J. Am. Soc. Mass Spectrom, 17, 2006, 81-84.
Cousins, L. M., et al., MS3 using the collision cell of a dandem mass spectrometer system, Rapid Communications in Mass Spectrometry, 16, 2002, 1023-1034.
Dodonov, A., et al., A New Technique for Decomposition of Selected Ions in Molecule Ion Reactor Coupled with Ortho-Time-of-flight Mass Spectrometry, Rapid Communications in Mass Spectrometry, 11, 1997, 1649-1656.
Geiger, T., et al., Proteomics on an Orbitrap Benchtop Mass Spectrometer Using All-ion Fragmentation, Mollecular & Cellular Proteomics, 9, 2010, 2252-2261.

(Continued)

*Primary Examiner* — Nikita Wells
(74) *Attorney, Agent, or Firm* — A. J. Gokcek

(57) ABSTRACT

A method of dissociating ions in a multipole ion guide is disclosed. A stream of charged ions is supplied to the ion guide. A main RF field is applied to the ion guide to confine the ions through the ion guide. An excitation RF field is applied to one pair of rods of the ion guide. The ions undergo dissociation when the applied excitation RF field is resonant with a secular frequency of the ions. The multipole ion guide is, but not limited to, a quadrupole, a hexapole, and an octopole.

24 Claims, 11 Drawing Sheets

(56) References Cited

OTHER PUBLICATIONS

Gillet, L. C., et al., Targeted Data Extraction of the MS/MS Spectra Generated by Data-independent Acquisition: A New Concept for Consistent and Accurate Proteome Analysis, Mollecular & Cellular Proteomics, 11, 2012, 1-17.

Murrell, J., et al., "Fast Excitation" CID in a Quadrupole Ion Trap Mass Spectrometer, J. Am. Soc. Mass Spectrom, 14, 2003, 785-789.

Rakov, V. S., et al., Establishing Low-Energy Sequential Decomposition Pathways of Leucine Enkephalin and Its N-and C-Terminus Fragments Using Multiple-Resonance CID in Quadrupolar Ion Guide, J. Am. Soc. Mass Spectrom., 15, 2004, 1794-1809.

* cited by examiner

| | 4.8V | 5.6V | 6.4V | 7.2V | 8V | 8.8V | 9.6V |
|---|---|---|---|---|---|---|---|
| $E_f$ | .16 | .25 | .37 | .57 | .65 | .73 | .52 |
| $E_c$ | .93 | .85 | .78 | .77 | .50 | .32 | .09 |
| $E_{CID}$ | .15 | .21 | .29 | .44 | .33 | .24 | .05 |

Figure 4

| | 4.8V | 5.6V | 6.4V | 6.72V | 7.2V | 7.68V | 8V | 8.32V | 8.8V | 9.6V | 10.4V |
|---|---|---|---|---|---|---|---|---|---|---|---|
| $E_f$ | 0 | 0 | .10 | .17 | .34 | .56 | .81 | .95 | 1.00 | 1.00 | 1.00 |
| $E_c$ | .91 | .88 | .93 | .93 | .92 | .94 | .99 | .88 | .76 | .68 | .65 |
| $E_{CID}$ | 0 | 0 | .9 | .16 | .31 | .53 | .80 | .84 | .76 | .68 | .65 |

Figure 7

APPARATUS AND METHOD OF DISSOCIATING IONS IN A MULTIPOLE ION GUIDE

STATEMENT REGARDING FEDERALLY SPONSORED RESEARCH OR DEVELOPMENT

The invention was made with Government support under Contract DE-AC05-76RLO1830, awarded by the U.S. Department of Energy, and NIH Grant No. GM103497-03. The Government has certain rights in the invention.

TECHNICAL FIELD

This invention relates to collision induced dissociation of ions. More specifically, this invention relates to collision induced dissociation of ions in a multipole ion guide when an applied excitation RF field is resonant with a secular frequency of the ions.

BACKGROUND OF THE INVENTION

Multiplexed collision induced dissociation (CID) experiments, traditionally performed by axially exciting an ion population, suffer from under or over-fragmentation. The entire range of analyte ions is typically not dissociated by one selected collision energy. Though collision energies may be scanned to induce fragmentation over a wider range of precursor ions, this typically results in fragmentation of the fragment ions, yielding spectra that contain mostly secondary fragments that are not useful for structural characterization.

A method that dissociates a wide range of precursor ions while leaving the fragment ions intact is desired.

SUMMARY OF THE INVENTION

The present invention is directed to apparatuses and methods of dissociating ions in a multipole ion guide. In one embodiment, a method of dissociating ions in a multipole ion guide is disclosed. The method includes supplying a stream of charged ions to the ion guide. The method also includes applying a main radio frequency (RF) field to the ion guide to confine the ions through the ion guide. The method further includes applying an excitation RF field to one pair of rods of the ion guide. The ions undergo dissociation when the applied excitation RF field is resonant with a secular frequency of the ions.

Alternatively, the excitation RF field may be applied to a single rod of the one pair of rods of the ion guide.

The multipole ion guide is, but not limited to, a quadrupole, a hexapole, or an octopole. In one embodiment, the excitation RF field is applied to the rods as an antiphase waveform.

In one embodiment, the charged ions are injected into the ion guide from an ion mobility drift cell.

In one embodiment, the method further includes providing a Brubaker lens for focusing of the ions into the ion guide. The Brubaker lens may be coupled between the ion mobility drift cell and the ion guide.

In one embodiment, the excitation RF field is synchronized with an arrival time of the ions.

In one embodiment, the dissociation of the ions occurs within specific ion mobility separation ranges. In another embodiment, the ions are dissociated while any dissociated ions—having already been dissociated—are left intact. The dissociated ions are not excited.

The excitation waveform can be a sum of different waveforms of different frequencies corresponding to multiple m/z peaks.

In one embodiment the ion guide operates in a pressure range from about 1E-6 to about 1E-2 torr.

In another embodiment of the present invention, an apparatus for dissociating ions is disclosed. The apparatus includes a multipole ion guide for receiving a stream of charged ions. The apparatus also includes a main RF field source, coupled to the ion guide, for confining the ions through the ion guide. The apparatus further includes an excitation RF field source coupled to one pair of rods of the ion guide. The ions undergo dissociation when the applied excitation RF field is resonant with a secular frequency of the ions. In one embodiment, the apparatus further includes a transformer with a primary winding coupled to the excitation RF field source and a secondary winding coupled to the main RF field source.

Alternatively, the excitation RF field source may be coupled to a single rod of the one pair of rods of the ion guide.

In another embodiment of the present invention, a method of dissociating ions in a quadrupole ion guide is disclosed. The method includes supplying a stream of charged ions to the ion guide; applying a main RF field to both pairs of rods of the ion guide to confine the ions through the ion guide; and applying an excitation RF field to one pair of rods of the ion guide. The ions undergo dissociation when the applied field is resonant with a secular frequency of the ions, and the dissociated ions are left intact and not excited.

In another embodiment of the present invention, an apparatus of dissociating ions is disclosed. The apparatus includes a quadrupole ion guide for receiving a stream of charged ions; a main RF field source—coupled to both pairs of rods of the ion guide—for confining the ions through the ion guide; an excitation RF field source coupled to one pair of rods of the ion guide; and a transformer with a primary winding coupled to the excitation RF field source and a secondary winding coupled to the main RF field source. The ions undergo dissociation when the excitation RF field is resonant with a secular frequency of the ions, and dissociated ions are left intact and not excited.

BRIEF DESCRIPTION OF THE DRAWINGS

FIG. 4 shows a table of efficiency fragmentation results for a methionine enkaphalin peptide under different voltages.

FIG. 7 shows a table of efficiency fragmentation results for an angiotensin peptide under different voltages.

DETAILED DESCRIPTION OF THE PREFERRED EMBODIMENTS

The present invention is directed to methods and apparatuses for dissociating ions in a multipole ion guide. In one embodiment, an excitation RF field, such as a dipolar RF, is applied across a pair of electrodes or rods in an RF-only multipole ion guide following an ion mobility drift cell (IMS) and an optional Brubaker lens. The excitation RF field resonantly excites ions of particular m/z when applied at the fundamental secular frequency of ion motion. The frequency of the applied excitation RF field is swept in concert with the gating of ions into the IMS, such that mobility-resolved swaths of ions undergo collision induced dissociation (CID). The multipole ion guide is, but not limited to, at least one of the following: a quadrupole, a hexapole, or an octopole. The excitation waveform can be a sum of different waveforms of different frequencies corresponding to multiple m/z peaks.

In another embodiment, resonant CID is applied to a segmented multipole ion guide by the application of the excitation RF field in resonance with the fundamental secular frequency of the ions of interest. Fragmented ions are not excited and thus do not fragment. The segmented multipole ion guide utilizes high amplitude main RF field coupled with an excitation RF field for CID followed by a region with lower amplitude main RF. Alternatively, the resonant CID may be applied to a resistive coated multipole ion guide.

Figure 1:
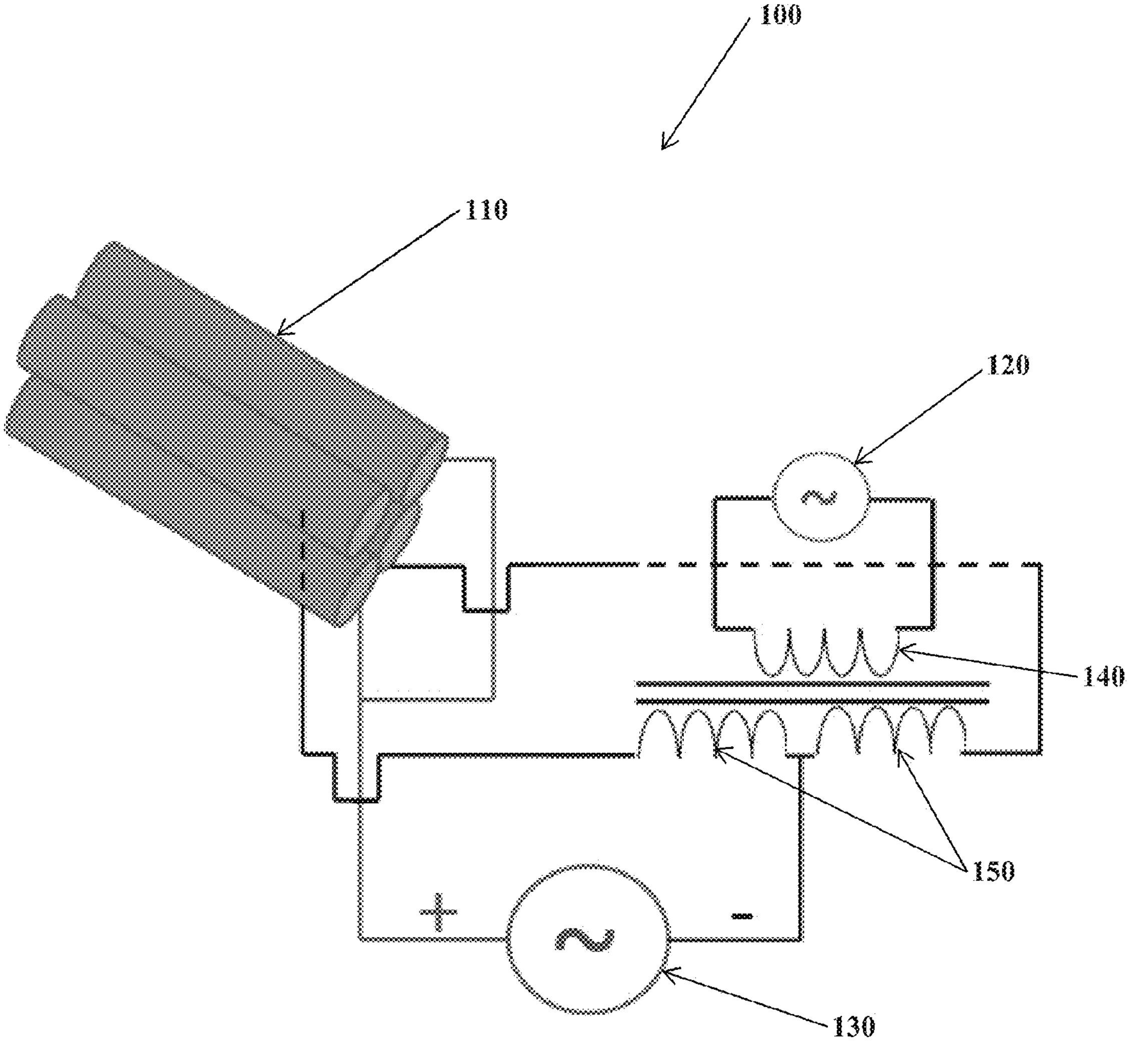
FIG. 1 illustrates an apparatus for dissociating ions in a multipole ion guide, in accordance with one embodiment of the present invention.

FIG. 1 illustrates an apparatus 100 for dissociating ions in a multipole ion guide, in accordance with one embodiment of the present invention. The apparatus 100 includes a quadrupole 110 for receiving a stream of charged ions. The apparatus 100 also include an excitation RF field source 120 coupled to one pair of rods of the quadrupole 110. The apparatus 100 further includes a main RF field source 130, coupled to both pairs of rods of the quadrupole 110, for confining the ions through the ions guide. The quadrupole 110 can be replaced with, for example, a hexapole or an octopole. The apparatus 100 also includes a transformer with a primary winding 140 coupled to the excitation RF field source 120, and a secondary winding 150 coupled to the main RF field source 130. The ions entering the quadrupole ion guide 110 undergo dissociation when the excitation RF field 120 is resonant with a secular frequency of the ions. Dissociated ions are left intact and not excited because they are moving with different secular frequencies. The apparatus 100 also includes a DC field for moving the ions through the ion guide. The charged ions can be injected into the ions guide from an IMS drift cell.

In one embodiment, the excitation and main RF fields 120 and 130 are applied to the rods as an antiphase waveform. In another embodiment, the apparatus 100 further includes a Brubaker lens (not shown) for focusing of the ions into the ion guide. The Brubaker lens can be coupled between the IMS drift cell and the ion guide.

In one embodiment, the excitation RF field 120 is synchronized with an arrival time of the ions exciting the IMS drift cell, and the dissociation of ions occurs within specific ion mobility ranges.

Figure 2:
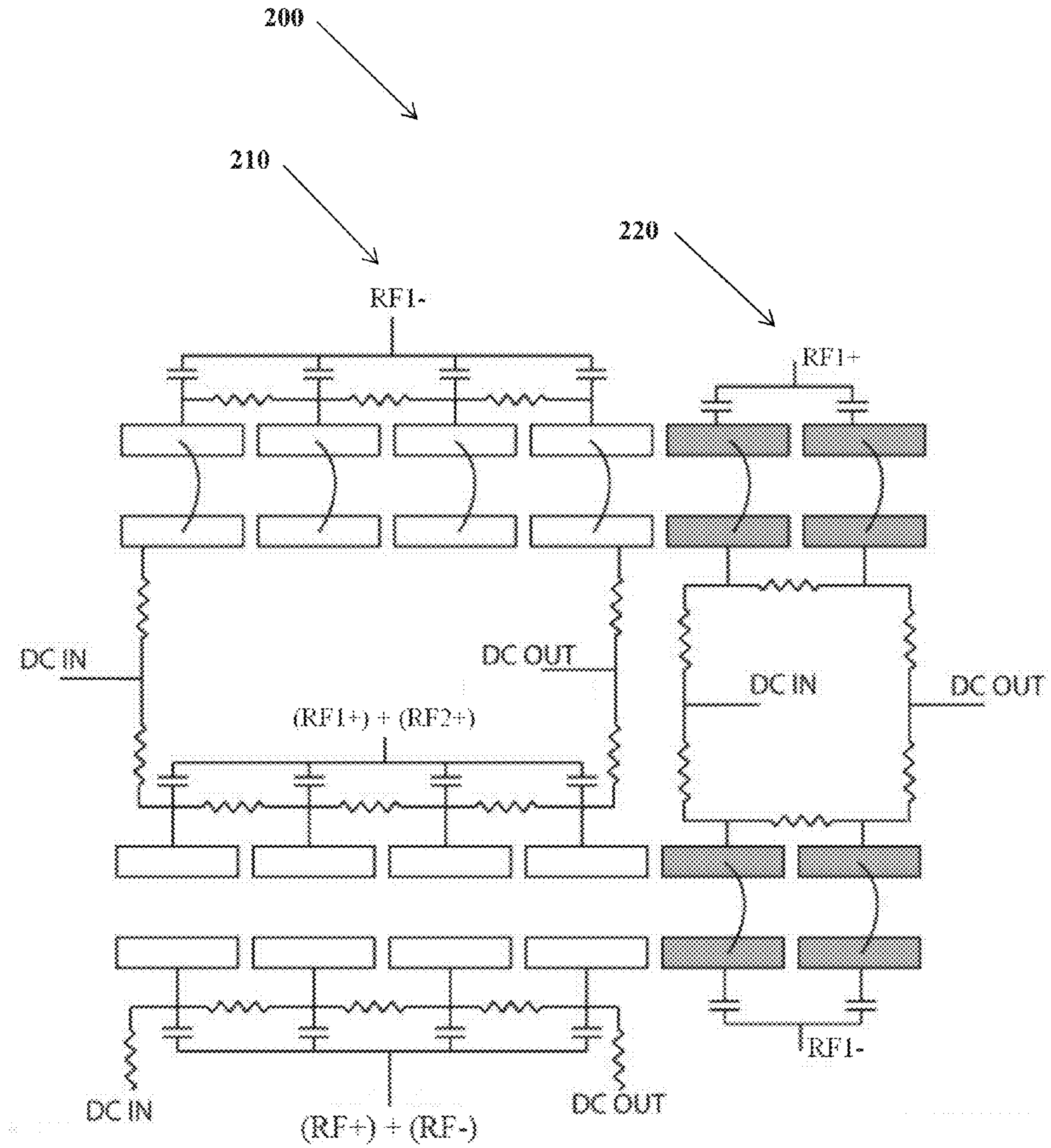
FIG. 2 illustrates an apparatus for dissociating ions in a multipole ion guide, in accordance with one embodiment of the present invention.

FIG. 2 illustrates an apparatus 200 for dissociating ions in a multipole ion guide, in accordance with one embodiment of the present invention. In this embodiment, the multipole ion guide is segmented into a first section 210 and a second section 220. The first section 210 utilizes a high amplitude main RF field coupled with an excitation RF field for CID, while the second section 220 includes an ion transmitting region with lower amplitude main RF. The apparatus 200 includes a main RF, which is labeled as RF1+ and RF1− (for the antiphase), and an excitation RF, which is labeled as RF2+ and RF2− (for the antiphase). The excitation RF field is applied across one of the pairs of a multipole, and the main RF field is applied across both pairs of the multipole. The pairs of rods not subject to the excitation waveform are electrically connected. A DC field is applied in each section 210 and 220 to move the ions along the sections of the ion guide.

Figure 3:
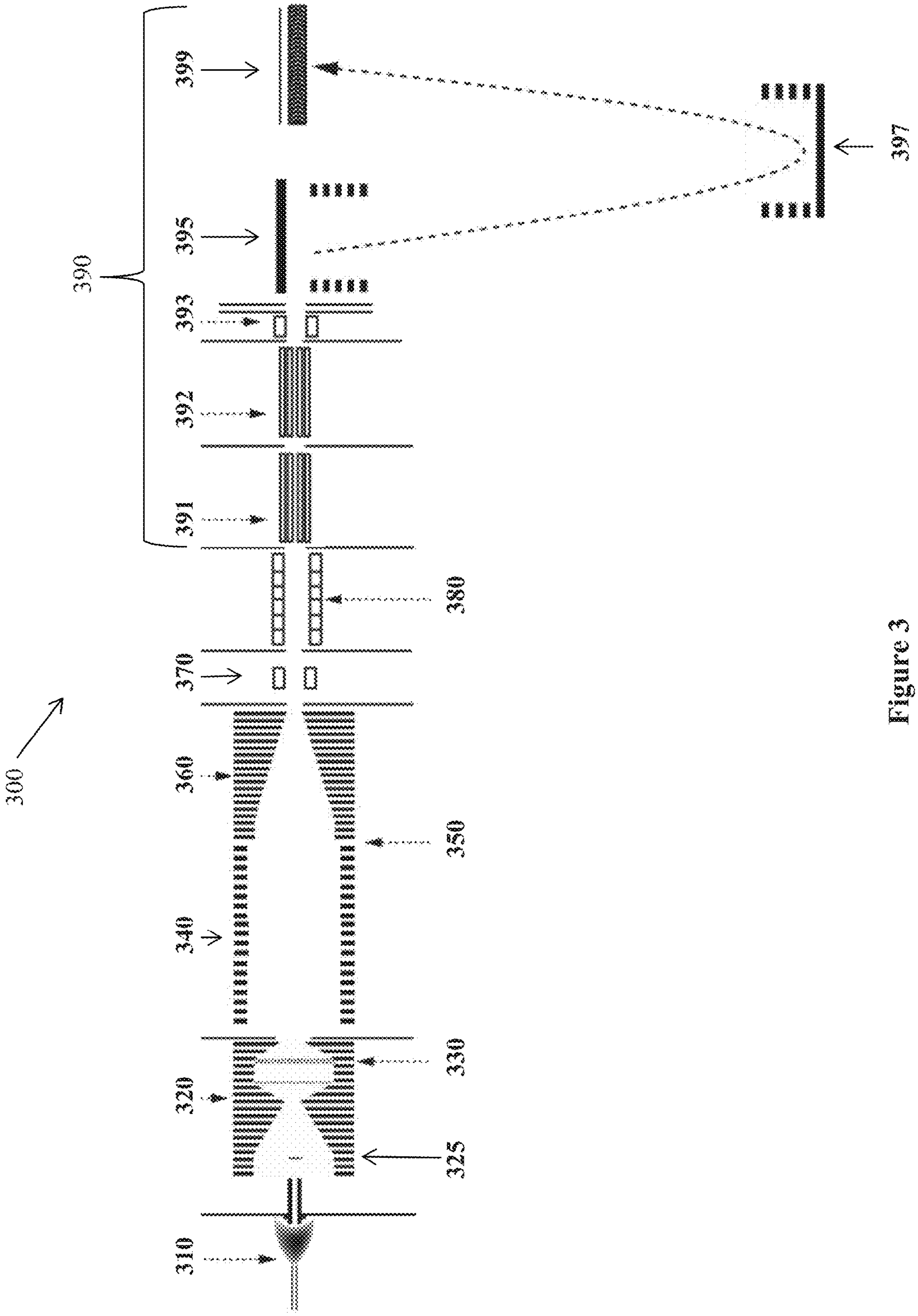
FIG. 3 illustrates an apparatus for dissociating ions, in accordance with one embodiment of the present invention.

FIG. 3 illustrates an apparatus 300 for dissociating ions, in accordance with one embodiment of the present invention. In this embodiment, the ion guide is incorporated within an ion mobility spectrometry time-of-flight mass spectrometry (IMS-TOFMS) instrument. In one embodiment, the ion guide operates in a pressure range from about 1E-6 torr to about 1E-2 torr. The apparatus includes an electrospray ionization (ESI) source 310 which creates charged ions with a distribution of charged states. The ESI source 310 can be a nanospray or nano-electrospray ionization source. Ions from the ESI source 310 are transmitted through a stainless steel capillary interface into an ion funnel trap 320. The ions are introduced into the ion funnel trap 320 through an electrodynamic ion funnel 325, which is used as a preceding ion guide. IMS is initiated with injection of a discrete ion packet through an ion gate 330 into an IMS drift cell 340. The ion gate 330 allows a discrete packet of ions from the ESI source 310 and the ion funnel trap 320 into the drift cell 340. Electrodes use a DC field to move the ions and an RF field to confine them. Ions with different mobilities are separated as they travel down the drift cell 340. A gas inlet 350 introduces buffer gas into the IMS drift cell. Smaller ions encounter fewer collisions with the buffer gas and travel faster through the drift cell 340, while larger ions encounter more collisions and travel more slowly through the drift cell 340. A rear ion funnel 360 is used to refocus the ions that exit the drift cell 340. An optional Brubaker lens 370 focuses ions before entering a multipole ion guide 380, which can be a quadrupole or segmented quadrupole ion guide of the present invention. The ion guide 380, in this embodiment, interfaces an IMS instrument with a TOFMS 390.

Still referring to FIG. 3, ions exiting the segmented quadrupole are injected into a TOFMS instrument. The TOFMS 390 includes octopole ion guides 391 and 392. The ions are passed through to quad 393. An ion extractor 395 extracts the ions and the ions reflect off a reflectron 397 or ion mirror. An ion detector 399 detects the times of flight of the reflected ions.

FIG. 4 shows a table of fragmentation efficiency results for a methionine enkaphalin peptide under different excitation RF voltages—measured from peak to peak of the RF waveform—using the apparatus 100 of FIG. 1. Different excitation RF voltages from 4.8V to 9.6V were applied to the electrodes during excitation. $E_{CID}$ (collision induced dissociation efficiency) denotes the percentage of fragments from the original precursor ions, methionine enkaphalin, in this example. $E_C$ (capture efficiency) denotes the percentage of ion fractions remaining after applying the excitation field and includes fragmented and non-fragmented ions added together. $E_F$ (fragmentation efficiency) denotes 100 minus the percentage remaining of the precursor ion.

Figure 5:
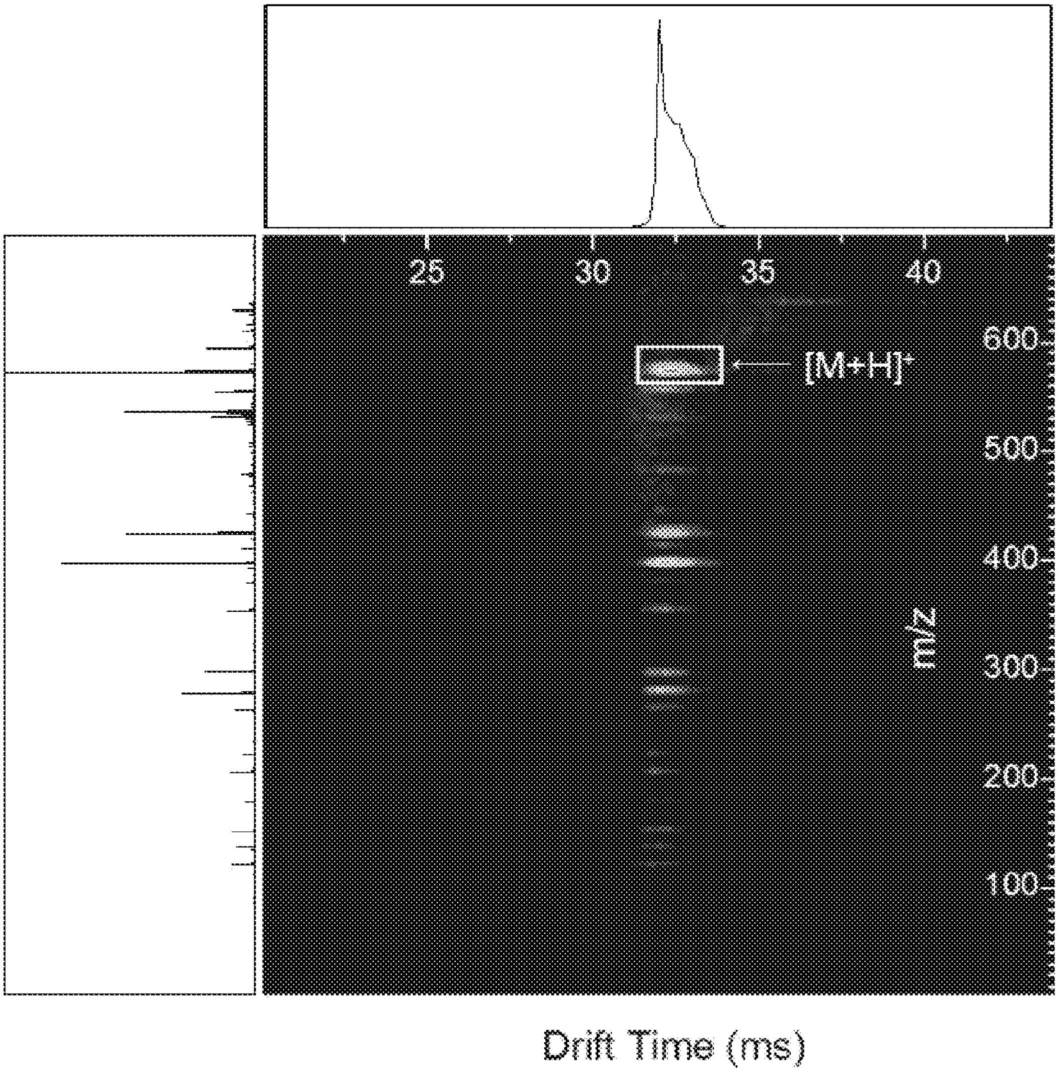
FIG. 5 shows the drift time spectrum of the fragmented peptides for methionine enkaphalin.

FIG. 5 shows the drift time spectrum of the fragmented peptides for methionine enkaphalin. The precursor ion is shown and designated as $[M+H]^+$. The spectrum also shows the fragmented ions from CID. The arrival time distribution is shown above on the top x-axis, with the mass spectrum on the left y-axis of the graph.

Figure 6:
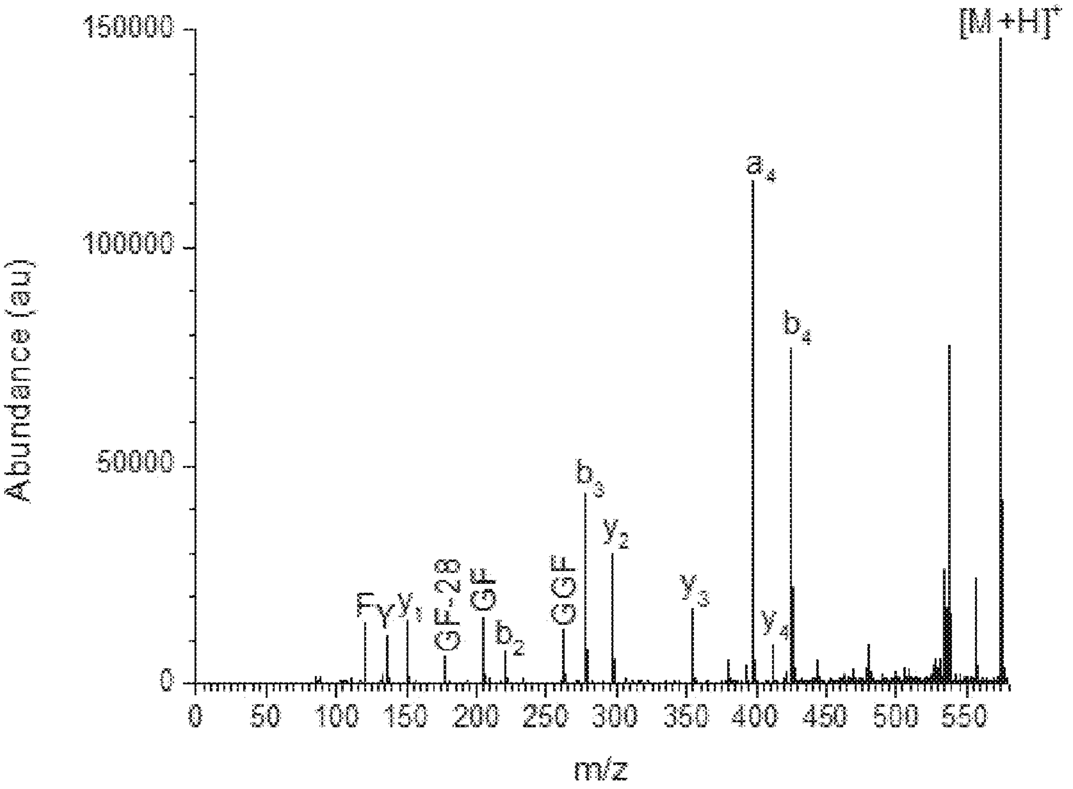
FIG. 6 shows a graph of m/z (on the x axis) against arbitrary abundance (au) for fragmented ions for the peptide methionine enkaphalin.

FIG. 6 shows a graph of m/z (on the x axis) against arbitrary abundance (au) on the y axis for fragmented ions and the precursor methionine enkaphalin peptide ions. All fragmented ions for this precursor are labeled and shown on the graph.

FIG. 7 shows a table of fragmentation efficiency results for an angiotensin I peptide under different excitation RF voltages, similar to the table of FIG. 4 and using the apparatus 100 of FIG. 1. Different excitation RF voltages from 4.8V to 10.4V were applied to the electrodes during excitation. $E_{CID}$ (collision induced dissociation efficiency) denotes the percentage of fragments from the original precursor ions, methionine enkaphalin, in this example. $E_C$ (capture efficiency) denotes the percentage of ion fractions remaining after applying the excitation field and includes fragmented and non-fragmented ions added together. $E_F$ (fragmentation efficiency) denotes 100 minus the percentage remaining of the precursor ion.

Another way to represent fragmentation efficiency is the sum of the fragments divided by the remaining precursor ion plus the sum of the fragments. For clarity:

$$E_f = \Sigma f / P + \Sigma f$$

$$E_c = P + \Sigma f / P_0$$

$$E_{CID} = \Sigma f / P_0 = (E_f)(E_c)$$

Figure 8:
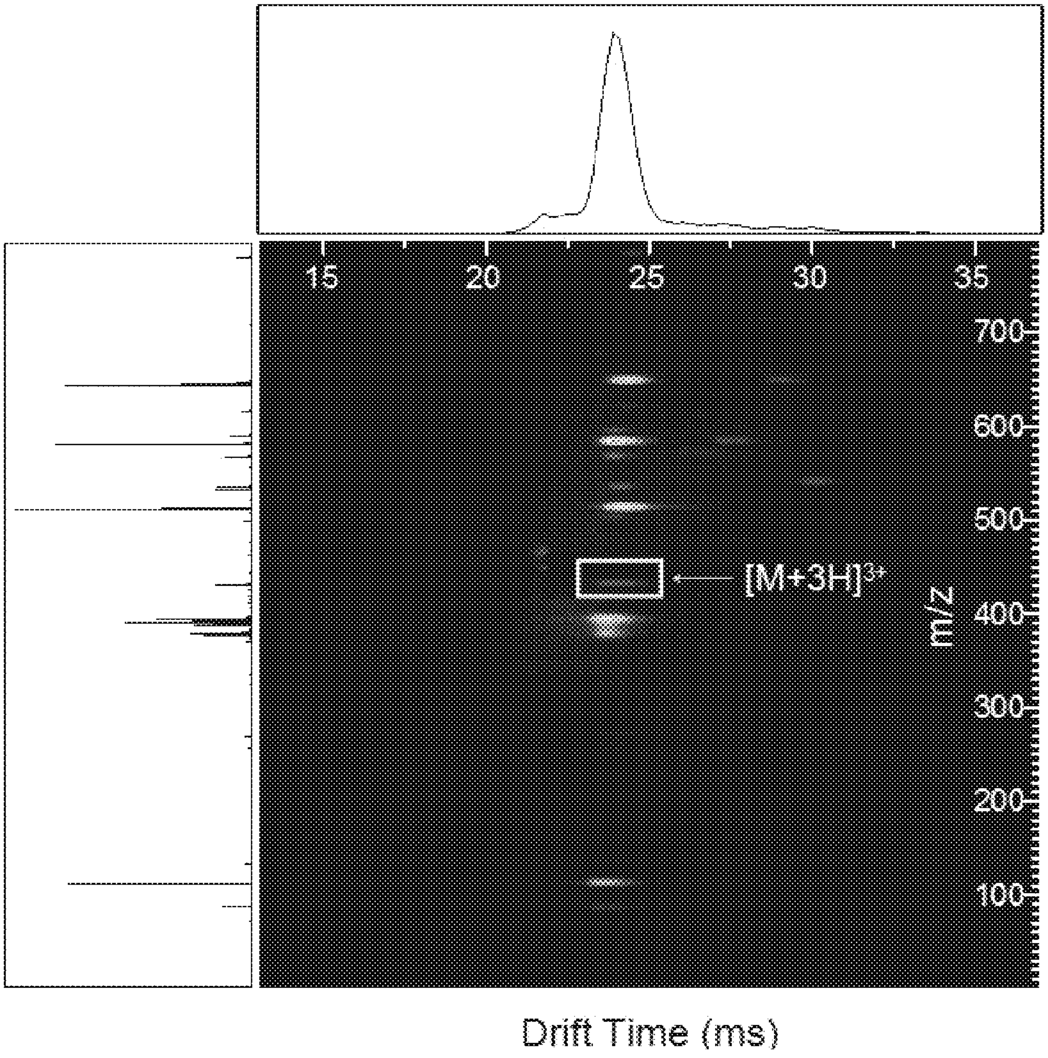
FIG. 8 shows the drift time spectrum of the fragmented peptides for angiotensin.

FIG. 8 shows the drift time spectrum of the fragmented peptides for angiotensin I. The precursor is designated as $[M+3H]^{3+}$. The spectrum also shows the fragmented ions from CID. The arrival time distribution is shown above on the top x-axis, with the mass spectrum on the left y-axis of the graph.

Figure 9:
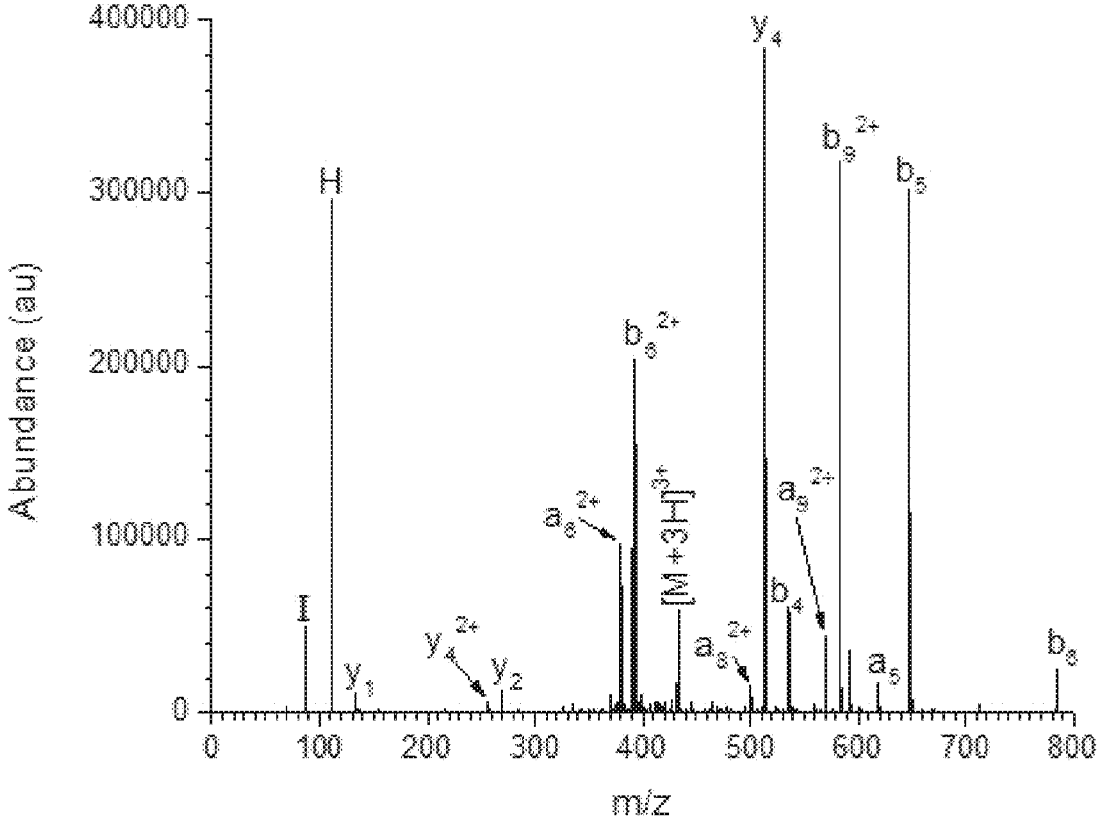
FIG. 9 shows a graph of m/z against arbitrary abundance (au) for fragmented ions for the peptide angiotensin.

FIG. 9 shows a graph of m/z (on the x axis) against arbitrary abundance unit (on the y axis) for fragmented ions and the precursor peptide angiotensin I ions. All fragmented ions for this precursor are labeled and shown on the graph. In this example, some of the fragmented ions have a bigger m/z charge ratio than the precursor, while other fragmented ions have a smaller m/z charge ratio than the precursor.

Figure 10:
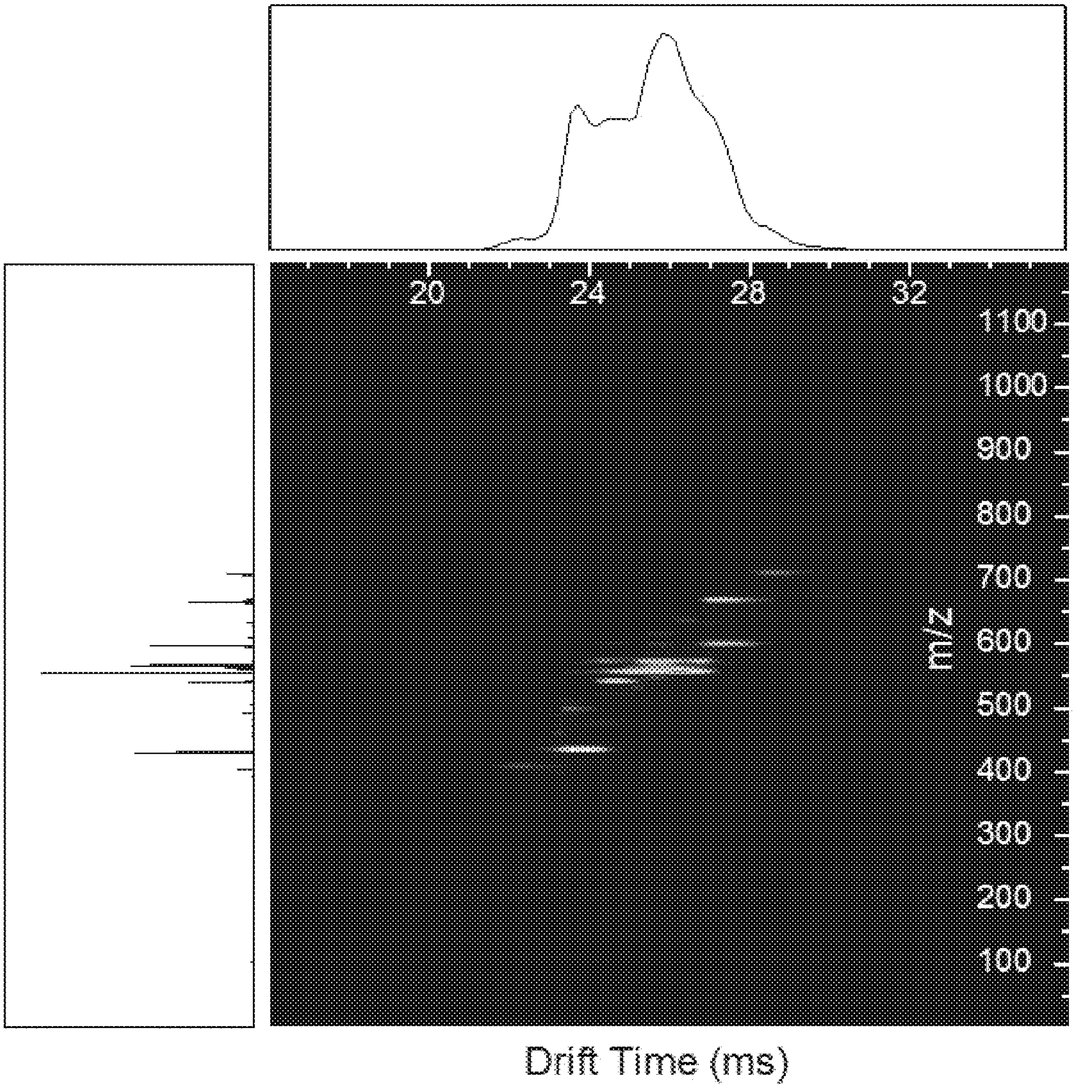
FIG. 10 shows the drift time spectrum for a mixture of peptides without excitation, resulting in no fragmented ions.

FIG. 10 shows the drift time spectrum for a mixture of peptides without the application of excitation RF, resulting in no fragmented ions. The mixture includes angiotensin I, neurotensin, substance P, and melittin. The arrival time distribution is shown above on the top x-axis, with the mass spectrum on the left y-axis of the graph.

Figure 11:
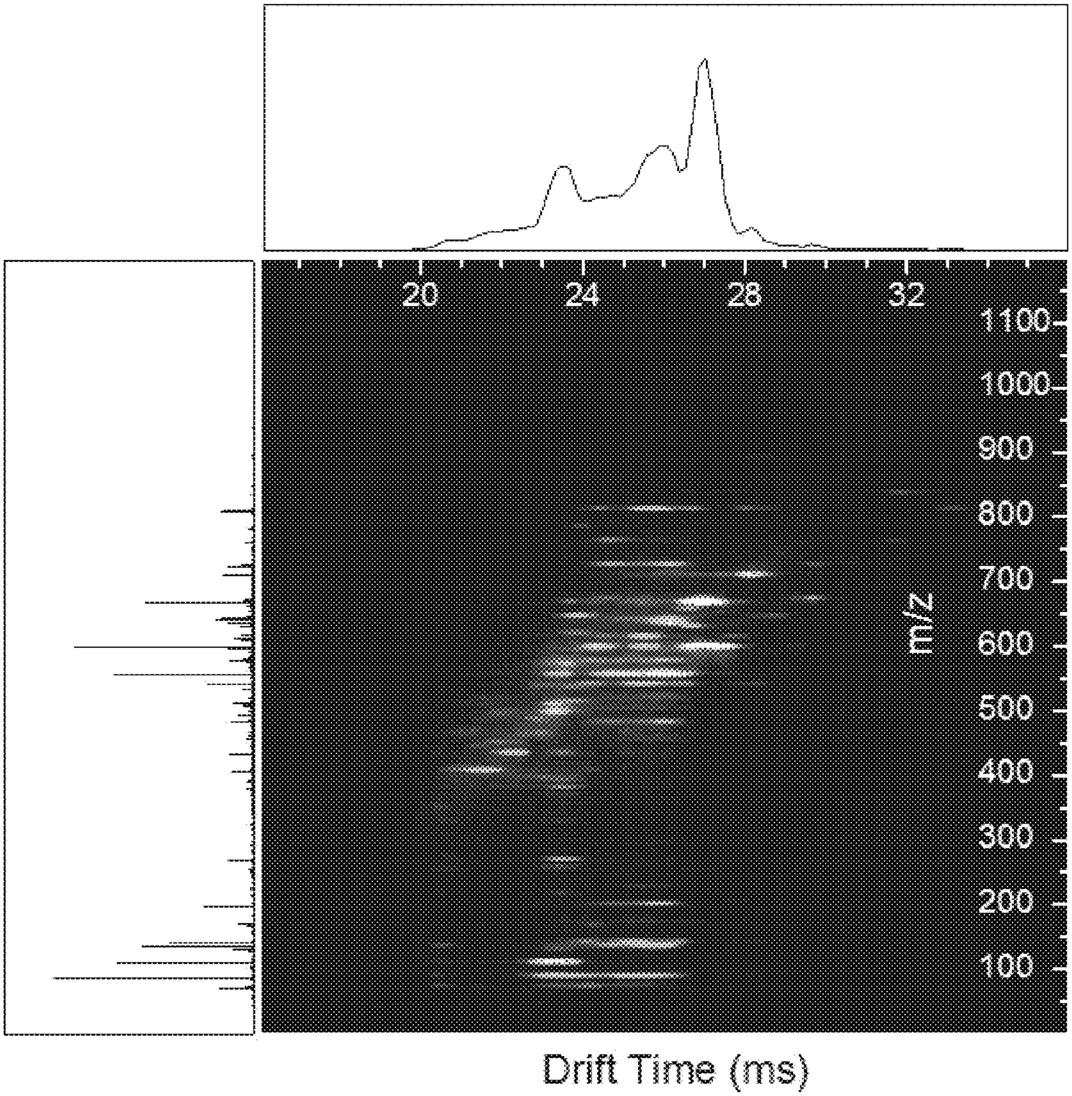
FIG. 11 shows the drift time spectrum for the same mixture of peptides as in FIG. 10 but with RF excitation applied, resulting in fragmented ions.

FIG. 11 shows the drift time spectrum for the same mixture of peptides as in FIG. 10 but with excitation RF applied, resulting in fragmented ions. The arrival time distribution is shown above on the top x-axis, with the mass spectrum on the left y-axis of the graph.

Embodiments described above have various industrial applications and competitive advantages. For example, application to discovery-based proteomics where high ion utilization and fragmentation efficiencies as well as informative sequence fragments are desirable. Competitive advantages are, but not limited to, the increase in ion utilization, precursor-product matching and additional separation from the IMS stage, and control over which m/z ions are fragmented from utilizing RF resonant instead of axial CID.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of dissociating ions in a multipole ion guide comprising:
- a. supplying a stream of charged ions to the ion guide;
- b. applying a main radio frequency (RF) field to the ion guide to confine the ions through the ion guide; and
- c. applying an excitation RF field of an antiphase waveform to one pair of rods of the ion guide, wherein the ions undergo dissociation when the applied excitation RF field is resonant with a secular frequency of the ions.

2. The method of claim 1 wherein the multipole ion guide is at least one of the following: a quadrupole, a hexapole, and an octopole.

3. The method of claim 1 wherein the charged ions are injected into the ion guide from an ion mobility drift cell.

4. The method of claim 3 further comprising providing a Brubaker lens, coupled between the ion mobility drift cell and the ion guide, for focusing of the ions into the ion guide.

5. The method of claim 1 wherein the excitation RF field is synchronized with an arrival time of the ions.

6. The method of claim 1 wherein the dissociation of the ions occurs within specific ion mobility separation ranges.

7. The method of claim 1 wherein the ions are dissociated while any dissociated ions are left intact.

8. The method of claim 7 wherein the dissociated ions are not excited.

9. The method of claim 1 wherein the ion guide operates in a pressure range from about 1E-6 to about 1E-2 torr.

10. The method of claim 1 wherein the applying the excitation RF field to one pair of rods of the ion guide comprises applying the excitation RF field to a single rod of the one pair of rods of the ion guide.

11. An apparatus for dissociating ions comprising:
- a. a multipole ion guide for receiving a stream of charged ions;
- b. a main RF field source, coupled to the ion guide, for confining the ions through the ion guide;
- c. an excitation RF field source coupled to one pair of rods of the ion guide, wherein the ions undergo dissociation when the applied excitation RF field of an antiphase waveform is resonant with a secular frequency of the ions.

12. The apparatus of claim 11 wherein the multipole ion guide is at least one of the following: a quadrupole, a hexapole, and an octopole.

13. The apparatus of claim 11 further comprising an ion mobility drift cell for injecting the charged ions into the ion guide.

14. The apparatus of claim 13 further comprising a Brubaker lens, coupled between the ion mobility drift cell and the ion guide, for focusing of the ions into the ion guide.

15. The apparatus of claim 11 further comprising a transformer with a primary winding coupled to the excitation RF field source and a secondary winding coupled to the main RF field source.

16. The apparatus of claim 11 wherein the ion guide operates in a pressure range from about 1E-6 to about 1E-2 torr.

17. A method of dissociating ions in a quadrupole ion guide comprising:
- a. supplying a stream of charged ions to the ion guide;
- b. applying a main radio frequency field to both pairs of rods of the ion guide to confine the ions through the ion guide; and
- c. applying an excitation RF field of an antiphase waveform to one pair of rods of the ion guide, wherein the ions undergo dissociation when the applied excitation RF field is resonant with a secular frequency of the ions, and wherein dissociated ions are left intact and not excited.

18. The method of claim 17 wherein the charged ions are injected into the ion guide from an ion mobility drift cell.

19. The method of claim 18 further comprising providing a Brubaker lens, coupled between the drift cell and the ion guide, for focusing the ions into the ion guide.

20. The method of claim 17 wherein the excitation RF field is synchronized with an arrival time of the ions.

21. The method of claim 17 wherein the dissociation occurs within specific ion mobility separation ranges.

22. An apparatus for dissociating ions comprising:

a. a quadrupole ion guide for receiving a stream of charged ions;

b. a main RF field source, coupled to both pairs of rods of the ion guide, for confining the ions through the ion guide;

c. an excitation RF field source coupled to one pair of rods of the ion guide; and d. a transformer with a primary winding coupled to the excitation RF field source and a secondary winding coupled to the main RF field source, wherein the ions undergo dissociation when the excitation RF field of an antiphase waveform is resonant with a secular frequency of the ions, and wherein dissociated ions are left intact and not excited.

23. The apparatus of claim 22 further comprising an ion mobility drift cell for injecting the charged ions into the ion guide.

24. The apparatus of claim 23 further comprising a Brubaker lens, coupled between the ion mobility drift cell and the ion guide, for focusing of the ions into the ion guide.

* * * * *